Jan. 2, 1968   E. R. CUNNINGHAM   3,361,496
LUBRICANT RETENTION SYSTEM FOR DYNAMOELECTRIC MACHINE
Filed Feb. 3, 1965   3 Sheets-Sheet 1

INVENTOR.
Eldon R. Cunningham,
BY John M. Stoudt
Attorney.

United States Patent Office 3,361,496
Patented Jan. 2, 1968

3,361,496
LUBRICANT RETENTION SYSTEM FOR DYNAMOELECTRIC MACHINE
Eldon R. Cunningham, Fort Wayne, Ind., assignor to General Electric Company, a corporation of New York
Filed Feb. 3, 1965, Ser. No. 430,056
9 Claims. (Cl. 308—132)

This invention relates to the construction of a lubrication system for a shaft and bearing. More specifically, it relates to an improved lubrication system which has a high retentivity of lubricant under varied speeds and loads.

The shafts of small dynamoelectric machines, such as fractional horsepower motors, are frequently journaled in sleeve-type bearings. Lubricants may be supplied to each of the bearing and shaft interfaces by a feed wick extending through an aperture in the bearing to the shaft. A storage wick may be associated with each feed wick in order to provide the lubrication system with a reserve of lubricant. The lubricant supplied to the bearing flows through the bearing and shaft interface to the ends of the bearing, and then continues to flow outwardly on the shaft. In order to conserve the lubricant in the system it is necessary to return the lubricant to the storage wick from the shaft after it has left the bearing.

In the past lubricant has been returned to the storage means or storage wick by an "oil thrower" arrangement. With the use of "oil throwers" the lubrication system is in practice open for ventilation, with resultant air movement over the oil. At temperatures of 60° C. and higher, the evaporation of the lubricant due to the air flow results in a significant loss of lubricant. This loss is, of course, even more pronounced at higher temperatures.

Other disadvantages of an "oil thrower" arrangement are also known. For example, an "oil thrower" arrangement is most efficient at high shaft speeds, and gives its poorest performance at low speeds. This characteristic is particularly ill-suited for wick-fed bearings, wherein the highest lubricant flow is at "low" speeds. Oil thrower arrangements are particularly ill-adapted for use with high inertia loads, wherein there is long period of slow speed coasting after de-energizing the motor. Similarly, they are not as effective in motors used to drive fans which are subjected to load speed "windmilling" due to external air movement.

It is therefore an object of this invention to provide an improved bearing lubrication system which has high retentivity of lubricant.

It is another object of this invention to provide a bearing lubrication system which effects improved circulation of the lubricant within the system.

It is a further object of this invention to provide an improved fully enclosed bearing lubrication system including lubricant storage and circulation means, wherein rotating seals and circulation are effected by preferred path capillary action.

These objects are accomplished in accordance with this invention, in one form thereof, by providing a wick-fed sleeve bearing in a dynamoelectric machine with a fully enclosed bearing lubrication system. This lubrication system includes wick material susceptive to capillary flow and capillary spacing of members of the system such that a closed path for capillary lubricant flow is provided between a lubricant storage means and the bearing-shaft interface. Lubricant is transferred from the shaft after it has left the bearing-shaft interface to the storage means by capillary flow between radially extending members which are spaced at a capillary dimension so as to provide radial flow paths from the shaft to the storage means. The storage means is typically a wicking having finer capillarity than the spacing between the radially extending members. The radially extending members are provided with a bore through which the shaft passes. A radial clearance of a capillary dimension is provided between the perimeter of the bore and the shaft. This radial clearance is designed so as not to be a preferred path as compared to the capillary path back to the lubricant storage means between the radially extending members. To enchance the capillary flow and to provide additional lubricant storage, an additional piece of working material or other lubricant feed and storage means may be interposed between the storage means or wick and the spaced members. This wicking material must have a finer capillarity than the spaced members, but a coarser capillarity than the storage wick, for lubricant will only flow from coarser to finer capillarities.

In a second embodiment the lubrication system is provided with additional radially extending members on each side of the bearing, spaced at a capillary dimension from the first radially extending members, so as to provide additional radial flow paths from the shaft to the storage means. The additional radial flow paths serve to return to the lubricant storage means any lubricant which flows along the shaft past the first radial flow path.

Other objects and further details of that which is believed to be novel in the invention will be clear from the following description and claims taken with the accompanying drawings wherein:

Figures 1, 2:
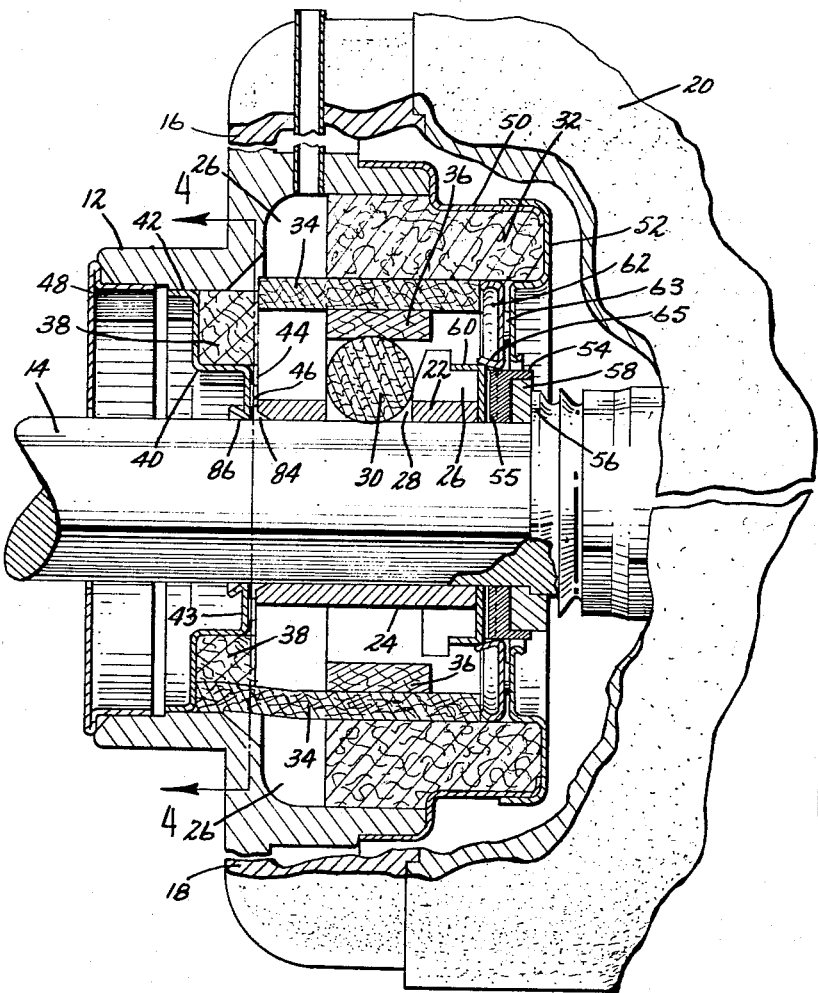
FIGURE 1 is an elevational view, partially broken away to shown details of one end of a dynamoelectric machine having a shaft and bearing provided with the improved lubrication system of this invention.
FIGURE 2 is an enlarged cross-sectional view of a portion of the shaft for the other end of the dynamoelectric machine showing a modified form of the wick-fed sleeve bearing provided with the improved lubrication system of this invention.

In FIGURE 1 the first embodiment of the improved lubrication system of this invention is shown interposed between an end shield 12 and a rotor shaft 14 of a dynamoelectric machine. The end shield is broken at 16 and 18 to foreshorten the height of drawing, so as to show the motor housing 20. The rotor shaft 14 is supported from the end shield 12 by a sleeve bearing 22. The sleeve bearing 22 is provided with a cylindrical portion 24 having a bore which encompasses the rotor shaft 14 at its journal, and with radially extending portions 26 which abut against the end shield 12, thereby supporting the sleeve bearing within the end shield.

In order to lubricate the interface between the sleeve bearing cylindrical portion 24 or its bore and the rotor shaft 14, an aperture 28 is provided in the cylindrical portion 24 of the sleeve bearing. A feed wick 30 is positioned in the aperture 28 so as to wet the surface of the rotor shaft 14 with lubricant. The lubricant which is applied to the shaft 14 by the feed wick 30 is stored in a storage wick 32. A pair of generally cylindrical wicks 34 and 36 are interposed between the storage wick 32 and the feed wick 30. The wicks 30, 32, 34, and 36 are made of a material which enhances capillary flow of the lubricant. Such materials are felted fibers such as wool, wood fiber, synthetic fiber, glass fiber, or other porous metal plastic, or ceramic forms.

The remainder of the structure of the improved lubrication system will be described in conjunction with the lubricant return paths from the shaft to the storage wick. An annular wick 38 is held in position adjacent the radially extending portions 26 of the sleeve bearing by a formed holder 40. Cylindrical portion 42 of the holder 40 engages the end shield 12, while annular portion 43 is spaced from bearing sidewall 44 by nibs 46 formed in the annular portion 43. Cylindrical portion 42 is sealed "oil tight" against end shield 12. To further protect the left end of the lubrication system an end cap 48 is provided to keep out dust and other contaminating material. The end cap 48 is secured to the end shield 12 by a press fit.

Referring to the right side of the lubrication system, the storage wick 32 is held in position by a formed oil well cover 50 and a formed adaptor 52. The joints are sealed oil tight. A non-adjustable thrust washer 54 is spaced from an enlarged section 56 of the shaft by a spacer 58, and a thrust cup 60 is interposed between the bearing 22 and the thrust washer 54. A ring 62 is positioned adjacent the adaptor 52, being spaced from it by nibs 63 formed on the ring. A flange 65 of the ring 62 engages the thrust cup 60.

The capillary flow of the lubricant within the left-hand portion of the improved lubrication system may be better understood from the portion of a modified lubrication system shown in FIGURE 2 for the other end of the machine. It differs principally from that revealed in FIGURE 1 in the precise wick structure illustrated for returning lubricant to the reservoir and for transferring lubricant to the journal of the bearing at that end of the machine. The direction of lubricant flow is indicated by the arrows 64. A storage wick 66 is shown in abutting relationship with a feed wick 68. A holder 69 is shown partially enclosing the storage wick 66. Nibs 70 are formed on holder 69 to space it from sidewall 72 of a sleeve bearing 73. As is indicated by the arrows 64, the lubricant flow is from storage wick 66 to the feed wick 68, to the surface of a shaft 74. The lubricant applied to the shaft 74 passes through the interface area 76, between the sleeve bearing 73 and the shaft 74, to an annular open region 78. The nibs 70 are of a height such that the spacing between the holder 69 and the bearing sidewall 72 is of capillary dimension. Typically, such a dimension is approximately 3 mils. The lubricant having left the interface area 76, it is now necessary to return it to the storage wick 66.

The lubricant is drawn from the open region 78 up to the storage wick 66 by capillary action. In order for the lubricant to pass from the space between the holder 69 and the bearing, it is necessary for the storage wick 66 to have a finer capillarity than that of the space between the holder and the bearing. It is a known principle that a lubricant will be transferred between areas of capillary flow only from a coarser to a finer capillarity.

A rotating seal for the lubrication system is formed by the capillary spacing 80 between the shaft 74 and the holder 69. Capillary flow through the space 80 is discouraged by proper choice of the spacing, that is greater than that between holder 69 and bearing sidewall 72, and by providing surfaces on the holder 69 and the shaft 74 in the region of the space 80, which are not wetted by the lubricant. A typical non-wetting material is oleophobic polytetrafluoroethylene. By discouraging capillary flow by the choice of the dimension of the spacing between the holder and the shaft, and by providing the non-wetting surfaces, the path between the bearing 73 and a holder 69 to the storage wick 66 becomes the preferred path, and most of the lubricant will flow to the storage wick 66 rather than further along the shaft through the space 80. A dust shield 82 is provided to keep contaminating materials away from the space 80, and to limit the ventilation of the space.

Figure 4:
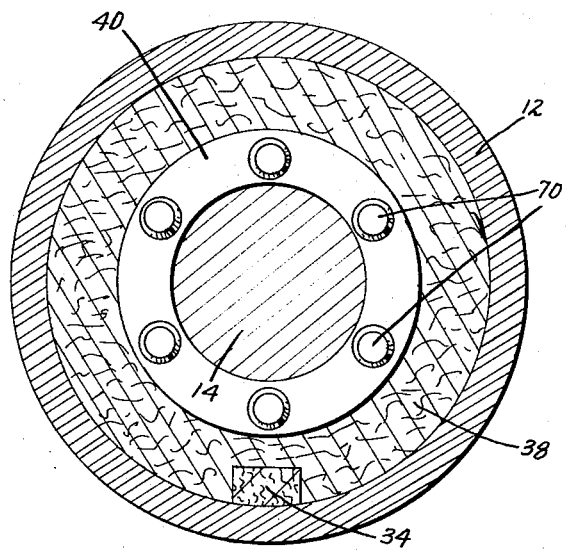
FIGURE 4 is an enlarged cross-sectional view taken along the line 4—4 in FIGURE 1.

Referring again to FIGURE 1, the lubricant flow discussed in FIGURE 2 can be used as a basis for describing the lubricant flow at the left side of the lubrication system of FIGURE 1. The lubricant flow to the shaft 14 is through the wick 34, the wick 36, and the feed wick 30. The lubricant then passes through the interface between the bearing 22 and the shaft 14, to the annular space 84. This space corresponds to the space 78 in FIGURE 2. The preferred path for lubricant flow by capillary action at the left side of the bearing is between the holder 40 and the bearing sidewall 44 to the wick 38. By capillary action the lubricant is moved from the wick 38 to the wick 34. The wick 38 and the wick 34 are in abutting relationship, as will be seen in the bottom half of FIGURE 1, and as is best seen in FIGURE 4. To effect circulation by capillary action the capillaries in annular wick 38 are finer than the capillary spacing between the holder 40 and the bearing sidewall 44. Similarly, the capillarity of wick 34 is finer than that of annular wick 38. And, the capillarity of the storage wick 32 is finer than that of wick 34. A capillary spacing 86 is provided between the shaft and the edge of the holder 40 adjacent the shaft 14. This spacing is greater than that between the holder 40 and the bearing sidewall 44. By further providing the shaft 14 and the holder 40 in the region of the spacing 86 with a non-wetting surface, there is provided a preferred flow path between the holder and the bearing to the wick 38 as compared to the flow path along the shaft through the space 86, thereby providing a sealed lubrication system.

Figure 3:
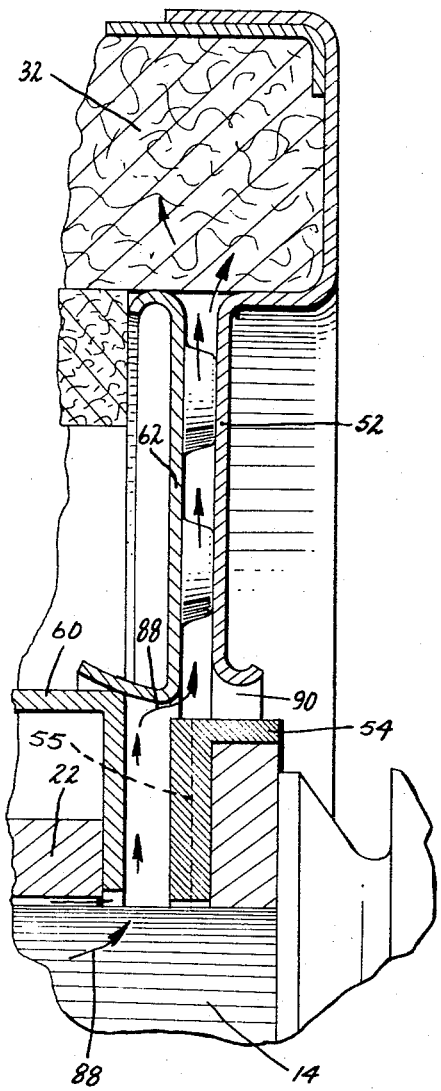
FIGURE 3 is an enlarged cross-sectional view of a portion of FIGURE 1.

To best describe the lubricant flow at the right end of the bearing, reference is made to FIGURE 3, which is an enlarged view of the extreme right-hand portion of the bearing 22 and the components of the lubrication system associated therewith. The lubricant flow from the shaft 14 to the storage wick 32 is indicated by the arrows 88. The lubricant flows along the shaft in the interface between the bearing 22 and the shaft 14 to the space between the grooved thrust washer 54 and the thrust cup 60. Although the axial spacing between the thrust washer 54 and the thrust cup 60 is generally of capillary dimension, the spacing may be as little as zero depending upon the amount of free end play and direction of thrust of the shafts. Thus, it is desirable to provide a number of radial oil distributing capillary grooves 55 in the face of washer 54 so that under zero spacing conditions oil will flow by capillary and centrifugal action outwardly through grooves 55 into the space between adaptor 52 and ring 62. This flow does not have to be induced but is readily handled when it occurs. The space between the ring 62 and the adaptor 52 is maintained by nibs 63 formed on the surface of the ring. Again, in order to provide for capillary flow from the space between the thrust washer and thrust cup to that between the ring and the adaptor, it is necessary for the spacing to be of capillary dimensions less than that at space 90. Similarly, the capillarity of the storage wick 32 should be less than that of the space between the ring and the adaptor, so that the lubricant will flow to the storage wick.

The rotating seal at the right side of the bearing is formed at the space 90. The surfaces of the thrust bearing 54 and the adaptor 52 adjacent the space 90 are provided with a non-wetting surface, so as to discourage capillary flow through the space 90 out of the lubrication system. The path of flow between the adaptor 52 and the ring 62 is a preferred capillary path as compared with that through the space 90.

Figure 5:
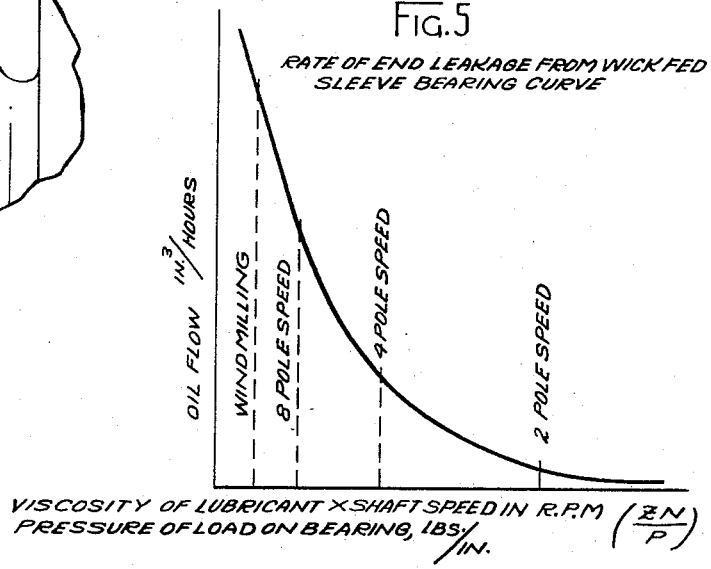
FIGURE 5 is a chart of oil flow vs. speed.

Referring to FIGURE 5, it will be seen why a capillary flow lubrication system is so particularly well adapted to a wick-fed sleeve bearing lubrication system. FIGURE 5 shows the rate of end leakage from a wick-fed sleeve bearing as plotted against the speed of a shaft supported by the bearing. It will be noticed that the oil flow rate of end leakage is inversely proportional to speed, the leakage flow being the greatest at slower speeds and the lowest at higher speeds. A lubricant throwing system gives its poorest performance at low speeds and its best performance at high speeds. Thus, the end leakage of a wick-fed sleeve bearing and a lubricant throwing system have opposite characteristics with respect to speed and are therefore generally incompatible. As opposed to a lubricant throwing system, the improved lubrication system of this invention utilizes capillary flow, which functions well at all speeds, including zero speed. The capillary flow lubrication system of this invention is particularly adapted to fan motors, which run at low speeds such as 300–600 r.p.m., and also for motors that have high inertial loads and which coast for a considerable time at slow speed after being shut off. Also, it is useful with fan motors that "windmill" due to external air movement. With a conventional lubricant thrower system, with the shaft turning at very low speeds, the end leakage lubricant flow from the bearing is at its greatest rate, while the coil thrower itself is functioning the poorest, whereby it is possible to lose all of the lubricant in the bearing system within a short period of time. Dotted lines are used to represent windmilling speed, and motor speeds for the same motor operating at 2-pole, 4-pole and 8-pole speeds.

Figure 6:
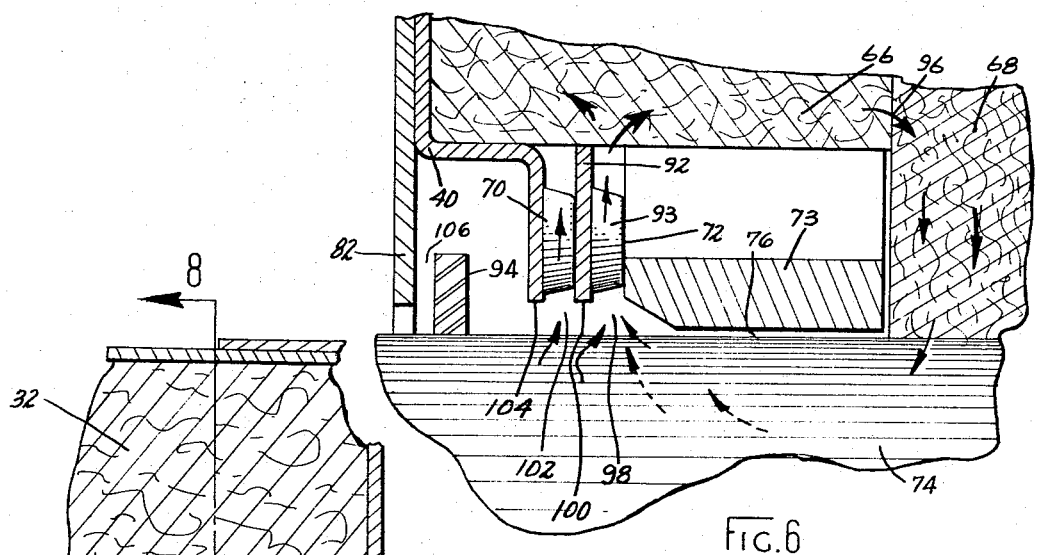
FIGURE 6 is a detailed cross-sectional view of a portion of a shaft and a wick-fed sleeve bearing provided with a second embodiment of the improved lubrication system of this invention.
Figure 7:
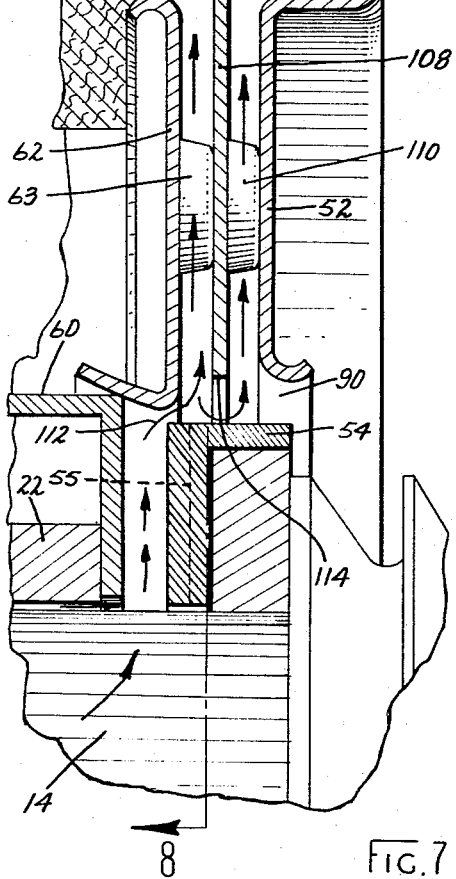
FIGURE 7 is a detailed cross-sectional view of another portion of the shaft and wick-fed sleeve bearing provided with the second embodiment of the improved lubrication system of this invention.
Figure 8:
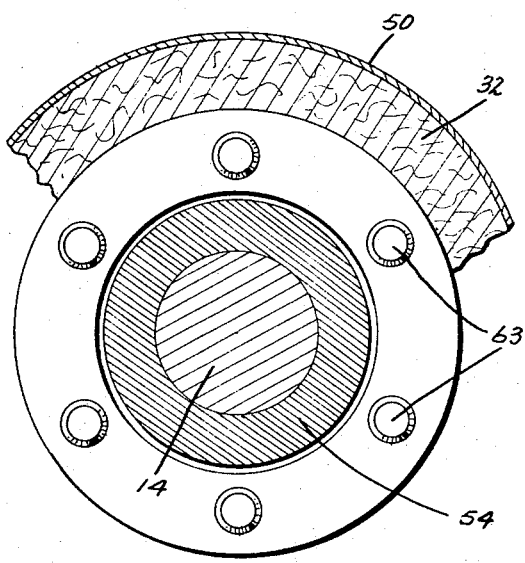
FIGURE 8 is a reduced cross-sectional view taken along the line 8—8 in FIGURE 7.

Referring now to FIGURES 6 through 8, portions of a second embodiment of the lubrication system are shown, these portions corresponding to those shown in FIGURE 2 and FIGURE 3 with respect to the first embodiment. More particularly, FIGURE 7 corresponds to FIGURE 3, and FIGURE 6 corresponds to FIGURE 2. The principal feature of the second embodiment is the provision of two capillary paths in parallel with each other, and in series relationship along the length of the shaft. Referring to FIGURE 6, which shows the left end of the bearing, those members shown which correspond directly to members shown in FIGURE 2 are indicated by the same numerals. It will be noticed that only two additional elements are provided, a washer 92 having nibs 93 formed thereon, and a rotating seal 94. The lubricant flow is indicated by the arrows 96, and is from the storage wick 66, to feed wick 68, to shaft 74. The lubricant then flows through the interface 76 between the bearing 73 and the shaft 74 to a first space 98. A capillary flow path is provided in the space created by the nibs 93 between the washer 92 and the bearing sidewall 72. The preferred path of lubricant flow by capillary action is from the space 98 through the space between the washer 92 and the bearing sidewall 72 to the storage wick 66. Some of the lubricant may continue to flow axially along the shaft, through the space 100 between the washer 92 and the shaft 74, into the space 102. The preferred path for capillary flow from the space 102 is through the space created by the nibs 70 between the holder 40 and the washer 92 to the storage wick 66. The space 104 between the holder 40 and the shaft 74 is very small, (but larger than spacing caused by nibs 70) but again non-wetting surfaces are provided in this space on a shaft 74 and the holder 40 to discourage further axial flow of the lubricant on the shaft. A rotating seal 94 is provided inside of the dust shield 82, and spaced closely thereto so as to form a labyrinth 106 therebetween. This labyrinth prevents the entrance of foreign material into the closed lubrication system.

In FIGURE 7, which shows the right end of the bearing, those components of the system which are the same as in FIGURE 3 carry the same identifying numerals. The only additional element provided in this portion of the second embodiment of the lubrication system is a washer 108 having nibs 110 formed thereon. The path of lubricant flow is indicated by the arrows 112. Lubricant flow between the ring 62 and the washer 108 is essentially the same as described with respect to FIGURE 3. Any lubricant which might pass through the space 114 between the washer 108 and the thrust washer 54 is returned to the storage wick 32 through the capillary path provided by the spacing between the adaptor 52 and the washer 108. Furthermore, a close spacing 90 is formed between the adaptor 52 and the thrust washer 54. The surfaces forming spacing 114 and 90 are provided with non-wetting surfaces so as to discourage lubricant flow out of the lubrication system. The flow path between the washer 108 and the adaptor 52 thereby acts as a backup for the primary flow path between the ring 62 and the washer 108. The concentric arrangement of the components of FIGURE 7 will be better understood by reference to FIGURE 8, which is a cross-sectional view taken along line 8—8 in FIGURE 7.

While specific embodiments of the invention have been shown, other embodiments of the invention will be apparent to those skilled in the art, and it is intended to cover by the appended claims all embodiments falling within the scope thereof.

What I claim as new and desire to secure by Letters Patent of the United States is:

1. In a bearing and shaft lubrication system,
   (a) a shaft,
   (b) a sleeve bearing, having first and second ends, surrounding a portion of said shaft and supporting said shaft,
   (c) a lubricant storage means disposed radially outwardly of said bearing,
   (c) a lubricant storage means disposed radially outwardly of said bearing,
   (d) a lubricant feed means for supplying lubricant from said storage means to the interface between said shaft and said bearing,
   (e) a first radially extending member axially spaced from said first end of said bearing so as to provide a first capillary flow path extending from said shaft radially outwardly to said lubricant storage means,
   (f) a thrust cup abutting said second end of said bearing,
   (g) a thrust washer having a radial face, first portions of said radial face adapted to abut said thrust cup, and second portions of said radial face spaced at a first distance from said thrust cup so as to provide a second capillary flow path extending from said shaft radially outwardly, and
   (h) a pair of radially extending members generally surrounding said thrust cup and said thrust washer, and axially spaced from each other by a second distance, so as to provide a third capillary flow path, said second distance being less than said first distance, the lubricant storage means having a finer capillarity than said first, second, and third capillary flow paths so that the lubricant is transferred from said shaft to said storage means by capillary action.

2. For use in a dynamoelectric machine having a rotor shaft, a lubrication system comprising: a sleeve bearing having a bore and adapted to support a rotor shaft, with the sleeve bearing having at least one side wall; a lubricant storage means of a first capillarity disposed radially outwardly of said bearing bore; a lubricant feed means for supplying lubricant from said storage means to said bearing bore; capillary transfer means extending between said bearing bore and said storage means for transporting lubricant therebetween, said capillary transfer means including at least one plate means located at a predetermined distance from said at least one side wall of said bearing, said plate means and the at least one side wall together defining a capillary spacing of a second capillarity, with said capillary spacing providing at least a portion of a capillary lubricant flow path between said bearing bore and said lubricant storage means.

3. The lubrication system of claim 2 wherein said plate means includes at least one projection engaging said at least one bearing side wall for spacing said plate means at said predetermined distance from said bearing side wall.

4. The lubricant system of claim 2 wherein said plate means includes a portion surrounding and spaced at a second predetermined distance from said shaft to provide an annular opening between said portion and said shaft, and said second predetermined distance being greater than said predetermined distance whereby said capillary spacing provides a preferred lubricant capillary flow path and said annular opening effectively provides a lubricant seal.

5. The lubricant system of claim 4 wherein selected portions of said plate means and of said shaft in the vicinity of said annular opening include lubricant wetting resistant material for inhibiting the flow of lubricant through said annular opening.

6. The lubricant system of claim 2 wherein said bearing includes first and second spaced apart side walls; said at least one plate means comprising first and second plates respectively located at predetermined distances from said first and second side walls, each of said plates and associated side wall defining a capillary spacing, said capillary spacings providing lubricant flow paths between said bearing bore and said lubricant storage means.

7. The lubricant system of claim 2 including a second plate means located at a predetermined distance from said at least one plate means, said second plate means with said at least one plate means defining a second capillary spacing providing at least a portion of a second flow path between said bearing bore and said lubricant storage means.

8. The lubricant system of claim 7 wherein said plate means includes at least one projection engaging said at least one bearing side wall for spacing said plate means at said predetermined distance from said side wall, and said second plate means includes at least another projection engaging said plate means for spacing said second plate means at said second predetermined distance from said plate means.

9. For use in a dynamoelectric machine having a rotor shaft disposed at least partially within a housing, a lubrication system comprising: a sleeve bearing disposed within said housing and adapted to support a rotor shaft, said bearing having a bore; a lubricant storage means disposed radially outwardly of said bearing bore; capillary transfer means extending between said bearing bore and said lubricant storage means for conveying lubricant therebetween, said capillary transfer means including at least one plate means located adjacent an end of said bearing, said at least one plate means having a wall portion in the vicinity of the end of said bearing, said wall portion comprising a portion of a capillary flow spacing; and lubricant sealing means for preventing lubricant from escaping from said capillary flow spacing.

References Cited

UNITED STATES PATENTS

| | | | |
|---|---|---|---|
| 1,667,807 | 5/1928 | Johnson | 308—132 X |
| 2,014,584 | 9/1935 | Peineke et al. | 308—132 X |
| 2,046,982 | 7/1936 | Warren | 308—132 X |
| 2,233,880 | 3/1941 | Ballman | 308—134.1 |
| 2,558,598 | 6/1951 | Wightman | 308—132 |
| 2,633,393 | 3/1953 | Bradley | 308—132 |
| 2,685,658 | 8/1954 | Feiertag | 308—132 X |
| 2,688,521 | 9/1954 | Annen | 308—187.2 |
| 3,250,579 | 5/1966 | Tupper et al. | 208—127 |
| 3,250,932 | 5/1966 | Tupper | 308—132 X |
| 3,264,045 | 8/1966 | Tupper | 308—127 X |

FOREIGN PATENTS

| | | |
|---|---|---|
| 603,245 | 8/1938 | Germany. |

MARTIN P. SCHWADRON, *Primary Examiner.*

R. F. HESS, *Assistant Examiner.*